United States Patent Office 2,782,232
Patented Feb. 19, 1957

2,782,232

PRODUCTION OF GENTISATES

Wesley C. Stoesser and William R. Surine, Midland, Mich., assignors to The Dow Chemical Company, Midland, Mich., a corporation of Delaware No Drawing. Application May 13, 1953,
Serial No. 354,870

8 Claims. (Cl. 260—521)

This invention concerns an improved method for the production of gentisates, particularly sodium gentisate. It pertains especially to the recovery of sodium gentisate, or gentisic acid, from a hydrolysis mixture in which it is formed.

It is known that gentisic acid may be prepared by hydrolyzing, or fusing, a 5-halosalicylate with an alkali such as sodium hydroxide or potassium hydroxide. The reacted mixture comprises salts of both gentisic acid and salicylic acid. Gentisic acid, which is far more soluble than salicylic acid in water, has heretofore been recovered from the crude reaction mixture by dissolving the latter in water, acidifying the solution with a strong acid such as hydrochloric acid, extracting gentisic acid from the solution with ether, crystallizing gentisic acid from the extract, and purifying the gentisic acid by recrystallization. Because of the number of steps and materials involved and the flammability of the extractant, this known procedure for the recovery of gentisic acid is not well adapted to commercial practice.

We have found that although gentisic acid is far more soluble than salicylic acid in water, sodium gentisate is less soluble than sodium salicylate in water and can be separated by crystallization from an aqueous solution of the two compounds. We have further found that by enriching such a solution with other water-soluble sodium salts, particularly ionizable inorganic sodium salts, the solubility of the sodium gentisate is reduced to greater extent than that of the sodium salicylate and the degree of separation of the salts by crystallization of the sodium gentisate from the solution is improved. We also have found that the proportion of the sodium gentisate that can be crystallized from an aqueous solution of sodium gentisate and sodium salicylate as substantially the only salts present becomes less as the pH of the solution is reduced below, or increased above, 7, but that when another ionizable sodium salt is initially dissolved in the solution the pH value of the solution may be decreased, e. g. to 3 or lower, without appreciable decrease in the proportion of the sodium gentisate that can readily be crystallized from the solution. Apparently, such addition of a different, and preferably a more highly ionized, sodium salt, e. g. NaCl or Na₂SO₄, to the solution has an effect of converting gentisic acid to its sodium salt and thus permitting crystallization of the latter even when the solution is quite strongly acidic.

On a basis of these discoveries, we have devised an improved method for the production of sodium gentisate, or gentisic acid, which comprises hydrolyzing a 5-halosalicylic acid, or a salt thereof, by reaction with an alkaline sodium compound, bringing an aqueous solution of the reaction products to a pH value not exceeding 9 and preferably below 8, and crystallizing the sodium gentisate directly from the solution. The mother liquor may then be acidified to liberate the salicylic acid and the latter be recovered by crystallization. The crystalline sodium gentisate may be used or marketed as such or be acidified to obtain gentisic acid.

The reaction between an alkaline sodium compound and a 5-halosalicylic acid, or a salt thereof, to form a mixture comprising sodium gentisate and sodium salicylate may be carried out in ways known to the art. It is preferably accomplished by heating a sodium salt of a 5-halosalicylic acid, e. g. 5-chlorosalicylic acid, 5-bromo-salicylic acid, or 5-iodosalicylic acid, together with an aqueous solution containing its molecular equivalent or more of an alkaline sodium compound such as sodium hydroxide, sodium carbonate, or a mixture thereof, at a reaction temperature until the hydrolysis is substantially complete. It is important that the hydrolysis be carried substantially to completion, i. e. to a point at which 97 percent or more of the halogen of the halosalicylate has been removed by hydrolysis, since the presence of an appreciable amount of unconsumed halosalicylate in the reacted mixture results in contamination of the sodium gentisate subsequently crystallized from the mixture. In order to enhance the hydrolysis, a large excess, e. g. at least 2 and preferably from 3 to 5 molecular proportions or more, of the alkali is preferably employed per mole of the halosalicylate in carrying out the reaction. The liquid aqueous alkali solution may be of any desired concentration, e. g. of from less than 5 to 25 weight percent concentration or higher, but it is usually of at least 10 and preferably of 15 percent concentration or above. By using a fairly concentrated alkali in the reaction, the proportion of water present is limited and crystallization of the sodium gentisate product is facilitated. The hydrolysis may be enhanced by initially adding to the reaction mixture a small proportion of a hydrolysis catalyst, e. g. copper or a copper compound such as copper sulfate, cupric chloride, cupric bromide, cuprous chloride, cuprous bromide, or cuprous oxide, etc., but a catalyst is not required. The reaction may also be carried out in the presence of sodium sulfite or other reducing agent so as to reduce, or avoid, a loss of product through oxidation, but the presence of a reducing agent is not required. If desired, a water-soluble, ionizable sodium salt other than sodium gentisate or sodium salicylate, prefereably an inorganic sodium salt such as sodium chloride, sodium bromide, or sodium sulfate, etc., may be added to the mixture prior to the hydrolysis so as to enrich the mixture in such salt and facilitate crystallization of sodium gentisate from the reacted mixture, but such salt need not be added, or it may be added at any time prior to completion of the step of crystallizing sodium gentisate from the reacted mixture. The hydrolysis may be accomplished at atmospheric pressure or above. The conditions of time, temperature and pressure most favorable to the reaction vary, depending on the identity of the 5-halosalicylic reactant, the proportion of alkali employed, and whether a catalyst is used. The hydrolysis of 5-bromosalicylic acid with aqueous sodium hydroxide in the presence of a copper compound can be accomplished by heating the mixture to the boiling temperature, or thereabout, at atmospheric pressure. The extent of the reaction may be determined by periodically withdrawing an aliquot portion of the mixture and analyzing it to determine the amount of inorganic halide formed in the reaction.

After completion of the hydrolysis, the mixture is treated with sufficient acid to bring it to a pH value not higher than 9 and preferably of 8 or lower. Any acid, e. g. hydrochloric acid, hydrobromic acid, or sulfuric acid, etc., can be used for the purpose. The treatment with acid results in formation of a corresponding sodium salt other than sodium gentisate and enriches the mixture with such salt. If desired, the mixture can be rendered substantially neutral, e. g. of a pH value between 5.5 and 8.5, and be cooled to a temperature of 20° C. or lower to crystallize the sodium gentisate product which may be separated by filtration. Although such procedure permits recovery of the sodium gentisate in a substantial yield, a considerable amount of the compound remains dissolved in the mother liquor, unless the latter contains a fairly high concentration, e. g. 10 percent by weight, or more, of sodium chloride or a chemically equivalent proportion of another water-soluble sodium salt such as sodium bromide or sodium sulfate.

The hydrolysis liquor may be rendered as rich as desired in water-soluble, ionizable, inorganic sodium salts such as sodium chloride, sodium bromide, sodium sulfate, or a mixture thereof, either by using a large excess of an aqueous sodium hydroxide solution of 10 weight percent concentration or higher in the hydrolysis reaction and thereafter treating the mixture with sufficient inorganic acid to bring it to a pH value of 9 or lower, or by using the stoichiometric proportion, or only a small excess, of an alkaline sodium compound in the hydrolysis reaction and enriching the mixture with an added water-soluble and ionizable inorganic sodium salt such as one or more of those just mentioned. Usually, a combination of these operations is employed, e. g. a considerable excess of sodium hydroxide and/or sodium carbonate is used in the hydrolysis reaction and the mixture is enriched with an added inorganic sodium salt and brought to a pH value of 9 or lower prior to, or during, crystallization of the sodium gentisate. The inorganic sodium salt can be added prior to, during, or after the hydrolysis, or at any time prior to completion of the step of crystallizing sodium gentisate from the mixture.

For instance, sodium gentisate can be recovered in high yield by treating the crude hydrolysis liquor with a water-soluble ionizable inorganic sodium salt, and preferably one that is more soluble in water and more highly ionized than sodium gentisate, bringing the solution to a pH value not higher than 9, e. g. from 3 to 8 and preferable from 3 to 7, and cooling the mixture, if necessary, to crystallize the sodium gentisate product. Any water-soluble ionizable inorganic sodium salt can be used for such enrichment of the hydrolysis liquor with sodium ions. Examples of suitable sodium salts are sodium chloride, sodium bromide, sodium sulfate, etc. The sodium salt can be added before or after the treatment of the hydrolysis liquor with acid. The sodium salt is preferably used in amount sufficient to saturate the hydrolysis liquor therewith, but it can be added in smaller proportions. Even when added in small amount it causes an increase in proportion of sodium gentisate that can be crystallized from the liquor.

The above treatments of the hydrolysis mixture can be carried out at any temperature between the freezing point and boiling temperature of the liquor. Usually, at least part of the sodium gentisate precipitates during the treatments. If at a higher temperature, the treated mixture is cooled to 30° C. or below, preferably to between 20° C. and the freezing point of the liquor, so as to crystallize a large proportion of the sodium gentisate product. The latter is separated in usual ways, e. g. by filtering or centrifuging the mixture. The crystalline sodium gentisate is washed, e. g. with water or an aqueous sodium chloride solution, to remove remaining mother liquor. It may be marketed as such or be acidified to obtain gentisic acid as the product.

By operating in the preferred manner described above, nearly all of the sodium gentisate formed in the hydrolysis reaction can be separated as a crystalline product. The remaining mother liquor usually contains sodium salicylate. It can be acidified and the salicylic acid be crystallized therefrom.

The foregoing procedure for crystallizing sodium gentisate of good purity from an aqueous solution of the same and sodium salicylate can be applied, regardless of the source of such solution, provided the latter contains an appreciable concentration, e. g. 5 weight percent or more, of sodium gentisate and contains not more than 9 molecular equivalents of sodium salicylate per mole of of sodium gentisate. The hydrolysis mixtures herein dealt with contain sodium gentisate and sodium salicylate in suitable proportions and usually contain far more than 5 weight percent of sodium gentisate. If of lower concentration, they can be concentrated by evaporating water therefrom.

The following examples describe tests of, or pertaining to, the invention and illustrate certain of its advantages, but are not to be construed as limiting its scope.

EXAMPLE 1

In separate tests, the individual solubilities of sodium salicylate and of sodium gentisate in saturated aqueous sodium chloride solutions were determined by stirring, together with water, such compound and sodium chloride each in amount greater than could be dissolved by the water and then withdrawing a portion of the resulting aqueous liquor and analyzing it to determine the proportions of the two salts, i. e. sodium chloride and either sodium salicylate or sodium gentisate, dissolved therein. The aqueous salt mixture comprising sodium salicylate and sodium chloride was stirred at a temperature of 20.4° C. for 5 hours before withdrawing and analyzing a portion of the liquor. The latter contained 21.4 percent by weight of sodium salicylate and 18.8 percent of sodium chloride. The aqueous mixture comprising sodium gentisate and sodium chloride was stirred at a temperature of 19.3° C. for 3 hours before withdrawing and analyzing a portion of the liquor. The latter contained 0.65 percent by weight of sodium gentisate and 26.4 percent of sodium chloride.

EXAMPLE 2

This example shows the effect of changes in the pH value, and in the dissolved sodium chloride content, of aqueous solutions of salicylic acid and gentisic acid in causing precipitation of gentisic acid, or the sodium salt thereof, and on the yield and purity of gentisic acid recovered by separation and acidification of the precipitate. In each of a series of tests, salicylic acid and gentisic acid and, in certain instances, sodium chloride were dissolved in water to form a solution having the composition given in the following table. Each solution was brought to the temperature given in the table and treated with sufficient of an aqueous sodium hydroxide solution of 50 weight percent concentration to bring the resulting mixture to the pH value given in the table. Each mixture was then cooled to 15° C. and the resulting slurry of liquid and crystalline materials was filtered. The crystalline residue was washed on the filter with 100 ml. of cold water in each test in which sodium chloride had not been present in the starting solution, or with 100 ml. of a saturated aqueous sodium chloride solution in each test in which the starting solution contained sodium chloride. The crystalline material was dissolved by heating the same together with 75 ml. of water and the solution was acidified with hydrochloric acid and cooled to 15° C. to precipitate the organic acid, i. e. gentistic acid. The latter was separated by filtration, washed on the filter with 75 ml. of cold water and then dried at 70° C. The dried gentisic acid was weighed and tested to determine its melting point and percent purity. The table names, and gives the weight in grams of, each ingredient of each starting solution. It gives the temperature of the solution when it was brought to the pH value that is given. The table also gives the percent yield of the recovered gentisic acid, its melting point, and its percent purity, i. e. the percent by weight of gentisic acid therein.

Table

| Run No. | Starting Solution | | | | Alkali Treatment— | | Recovered Gentisic Acid | | |
| --- | --- | --- | --- | --- | --- | --- | --- | --- | --- |
| | Salicylic Acid, gms. | Gentisic Acid, gms. | $H_2O$, gms. | NaCl, gms. | at Temp. in °C. of— | to pH of— | M. P., °C. | Percent Purity | Percent Yield |
| 1 | 20 | 80 | 100 | 0 | 50 | 4.02 | 199–200 | 91.0 | 55.1 |
| 2 | 20 | 80 | 100 | 0 | 64 | 7.10 | 202–203 | 96.0 | 70.0 |
| 3 | 20 | 80 | 100 | 0 | 50 | 9.48 | 201.5–202.5 | 96.0 | 49.2 |
| 4 | 20 | 80 | 72 | 28 | 80 | 4.00 | 200.5–201.5 | 93.0 | 100.0 |
| 5 | 20 | 80 | 72 | 28 | 80 | 7.08 | 201–202 | 95.0 | 98.8 |
| 6 | 20 | 80 | 72 | 28 | 85 | 9.35 | 201–202 | 95.0 | 81.0 |

EXAMPLE 3

A mixture of 217 grams (1 mol) of 5-bromosalicylic acid, 184 grams (4.6 mols) of sodium hydroxide, 21.2 grams (0.2 mol) of sodium carbonate, 8 grams of copper sulfate, 2 grams of sodium bisulfite, and 736 grams of water was heated under reflux at 107° C. and atmospheric pressure under an atmosphere of nitrogen in an iron vessel for 21 hours, at the end of which time substantially all of the 5-bromosalicylate had been hydrolyzed. The mixture was cooled to about room temperature and filtered to remove insoluble copper compounds. The alkaline filtrate was neutralized to a pH value of 7.03 by treatment with 211 ml. of a concentrated aqueous hydrochloric acid solution (of about 37 percent concentration), whereupon sodium gentisate crystallized therefrom. The mixture was cooled to 15° C., filtered, and the crystalline residue was washed with 100 ml. of a saturated aqueous sodium chloride solution. The wet filter cake weighed 244.2 grams and apparently consisted for the most part of a hydrate of sodium gentisate. It was admixed with 100 ml. of water and dissolved by heating the mixture to 60° C. The solution was rendered strongly acidic by adding 50 ml. of concentrated hydrochloric acid thereto and was heated to boiling. Gentisic acid was crystallized from the acidified solution by cooling the latter to 20° C. and was removed by filtration. The crystalline gentisic acid was washed with 40 ml. of cold water and dried. There was obtained 84.4 grams of gentisic acid having a melting point of 204–205° C. The yield was 54.7 percent of theoretical, based on the amount of 5-bromosalicylic acid used as a starting material. By recrystallization from water, the sodium gentisate was obtained in a substantially pure form which, when acidified, yielded gentisic acid having a melting point of 205–206° C.

We claim:

1. In a method wherein a 5-halosalicylate is hydrolyzed substantially completely by reaction with an aqueous solution of a basic sodium compound to form a solution comprising sodium gentisate, the steps of enriching the solution with a water-soluble and ionizable sodium salt other than sodium gentisate and sodium salicylate and bringing the hydrolysis mixture to a pH value not higher than 9, crystallizing sodium gentisate from the resulting mixture, and removing crystalline sodium gentisate from the mixture while the latter is at a temperature not higher than 30° C.

2. A method, as claimed in claim 1, wherein the hydrolysis is accomplished in the presence of more than the stoichiometric amount of the basic sodium compound and the alkaline hydrolysis mixture is enriched with a water-soluble ionizable sodium salt other than sodium gentisate and sodium salicylate by adding thereto an inorganic acid in amount sufficient to bring the mixture to the pH value not higher than 9.

3. A method, as claimed in claim 2, wherein the hydrolysis mixture is further enriched with a water-soluble ionizable sodium salt other than sodium gentisate and sodium salicylate by adding such salt to the mixture prior to completion of the step of crystallizing sodium gentisate from the hydrolysis liquor.

4. A method, as claimed in claim 2, wherein the hydrolysis mixture is further enriched with a water-soluble, ionizable inorganic sodium salt which is added prior to completion of the step of crystallizing sodium gentisate from the hydrolysis liquor.

5. A method, as claimed in claim 2, wherein the hydrolysis mixture is further enriched with sodium chloride which is added prior to completion of the step of crystallizing sodium gentisate from the hydrolysis liquor.

6. A method which comprises hydrolyzing sodium 5-bromosalicylate by heating the same to a reaction temperature together with an aqueous solution containing more than its molecular equivalent of sodium hydroxide, and also containing a copper compound and a reducing agent, until the hydrolysis is complete, adding a hydrohalic acid in amount sufficient to bring the mixture to a pH value between 3 and 9, enriching the mixture by adding thereto a sodium halide in amount sufficient to form with the reaction liquor an aqueous solution containing at least 10 percent by weight of dissolved sodium halide, crystallizing sodium gentisate from the resulting mixture at a temperature not higher than 20° C., and separating the crystalline sodium gentisate from the mother liquor.

7. A method for separating sodium gentisate from mixtures comprising the same and sodium salicylate, which method comprises forming an aqueous solution thereof containing at least 5 percent by weight of the sodium gentisate and also containing at least 10 percent of a water-soluble, ionizable inorganic sodium salt, which solution has a pH value not higher than 9, crystallizing sodium gentisate from the mixture, and separating the crystalline sodium gentisate from the mother liquor.

8. A method for separating sodium gentisate from an alkaline hydrolysis liquor having sodium gentisate and sodium salicylate dissolved therein, which comprises treating said liquor with sufficient of an inorganic acid that forms a water-soluble ionizable sodium salt to bring the mixture to a pH value of from 3 to 9, crystallizing sodium gentisate from the resulting liquor, removing crystalline sodium gentisate from the mixture while the latter is at a temperature below 20° C., and removing adhering mother liquor from the crystalline product.

References Cited in the file of this patent

UNITED STATES PATENTS 2,588,679 Williams et al. Mar. 11, 1952
2,715,644 Wright et al. Aug. 16, 1955

OTHER REFERENCES

MacArdle: "Solvents in Synthetic Org. Chem." (Van Nostrand), 1925, pp. 158–165.